(12) United States Patent
Chitsazan et al.

(10) Patent No.: US 6,404,653 B1
(45) Date of Patent: Jun. 11, 2002

(54) MULTI-VOLTAGE TRANSFORMER

(75) Inventors: Ehsan Chitsazan, Cumming; John Gary Batson, Duluth; Joey Goodroe, Dacula, all of GA (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 09/697,652

(22) Filed: Oct. 26, 2000

Related U.S. Application Data

(60) Provisional application No. 60/161,438, filed on Oct. 26, 1999.

(51) Int. Cl.[7] .......................... H02M 3/335; H02M 1/12
(52) U.S. Cl. .............................. 363/16; 363/41; 363/97; 307/66; 307/150
(58) Field of Search .................. 307/65, 66, 72–75, 307/150; 363/16, 41, 95, 97, 131

(56) References Cited

U.S. PATENT DOCUMENTS

| | | | | |
|---|---|---|---|---|
| 4,517,470 A | * | 5/1985 | Cheffer | 307/64 |
| 5,184,025 A | * | 2/1993 | McCurry et al. | 307/66 |
| 5,369,563 A | * | 11/1994 | Miller | 363/56 |
| 5,371,666 A | * | 12/1994 | Miller | 363/98 |
| 5,461,263 A | * | 10/1995 | Helfrich | 307/64 |
| 5,465,011 A | * | 11/1995 | Miller et al. | 307/64 |
| 5,635,773 A | * | 6/1997 | Stuart | 307/66 |

* cited by examiner

Primary Examiner—Bao Q. Vu
(74) Attorney, Agent, or Firm—Troutman Sanders LLP; Gerald R. Boss; James E. Schutz

(57) ABSTRACT

A multi-voltage transformer includes an average current loop circuit, a pulse width generator, a push-pull driver, and a pulse width modulator coupled to the average current loop circuit, the pulse width generator, and the push-pull driver for generating pulses for driving a power supply. In a standard operating mode, the power supply is powered by an AC power source. The power supply uses the AC power source to drive the output of the power supply and to recharge the batteries associated with the power supply. When the power supply is operating on AC power, it translates the AC sinusoidal wave signal into a saw tooth wave signal that drives a pulse width modulator. When the AC power source is interrupted, the transformer switches the power source from the AC power source to a battery backup source. The transformer is designed to operate with a variety of battery voltages. The transformer monitors the voltage and current loads on the power supply and determines a duty cycle setting that will meet the demands of the system. An exemplary embodiment described herein operates with either 36 volt batteries or 48 volt batteries.

9 Claims, 5 Drawing Sheets

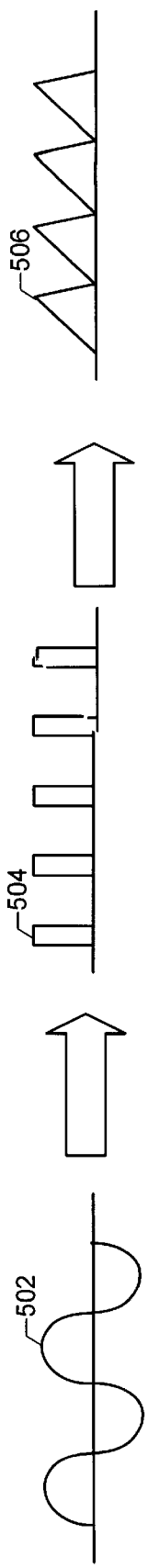

MULTI-VOLTAGE TRANSFORMER

CROSS-REFERENCE TO RELATED APPLICATION

This application claims the benefit of U.S. Provisional Patent Application Ser. No. 60/161,438 filed Oct. 26, 1999, entitled "MULTI-VOLTAGE TRANSFORMER."

TECHNICAL FIELD

The present invention relates to power supplies and, more specifically, to a ferro-resonant transformer for an uninterruptible power supply.

BACKGROUND OF THE INVENTION

Existing uninterruptible power supplies supply back-up alternating current to electronic components in the event of normal power in interruption. Such power supplies typically include a rechargeable battery, a rectifier circuit for providing a charging source to the battery and an inverter for producing alternating current from the battery. The transformers utilized within an uninterruptible power supply include windings for transforming normal service power to a load, auxiliary windings for battery charging, and windings for transforming battery-supplied alternating current to a load.

Typical uninterruptible power supplies utilize ferro-resonant transformers that are designed to operate exclusively with a specific battery type. In the field, uninterruptible power supplies generally use either 36 volt or 48 volt batteries. The batteries used depend upon the load to be driven by the power supply. An exemplary example of a prior art power supply can supply a 15 Amp output at 87 volts AC when used with a 36 volt battery. Another exemplary example of a prior art power supply with a different transformer, can supply a 22 amp output at 87 volts AC when used with a 48 volt battery source.

Customers often need to change from a 36 volt battery to a 48 volt battery if the load requirements of the system change. Thus, a different transformer must be used depending upon the voltage of the batteries installed in the system. Repair personnel who are charged with servicing and replacing defective power supplies and transformers and with modifying systems to meet changing needs must stock and transport at least two varieties of ferro-resonant transformers to accommodate the various battery types. Stocking and transporting the variety of ferro-resonant transformers increases the cost to the company and can become logistically difficult.

Therefore, there is a need in the art for an uninterruptible power supply that can operate with various types of batteries without requiring the transformer to be changed.

SUMMARY OF THE INVENTION

The present invention overcomes the above-described problems in the prior art by providing a power supply device, namely a transformer, for use with various types of batteries. The device operates with a single transformer and does not need to be matched to a certain battery type or voltage.

The transformer includes an average current loop circuit, a pulse width generator, a push-pull driver, and a pulse width modulator coupled to the average current loop circuit, the pulse width generator, and the push-pull driver for generating pulses for driving a power supply.

In a standard operating mode, the power supply is powered by an AC power source. The power supply uses the AC power source to drive the output of the power supply and to recharge the batteries associated with the power supply. When the power supply is operating on AC power, it translates the AC sinusoidal wave signal into a saw tooth wave signal that drives a pulse width modulator.

In an exemplary embodiment of the present invention, the duty cycle adjusts automatically based upon changes in the battery voltage and average battery current. This is done by monitoring the voltage and current loads on the power supply and determining a duty cycle setting that will meet the demands of the system.

Software inside the power supply monitors the pulses generated by the AC power source and replicates these pulses when the AC power source is interrupted. The software uses these pulses to synchronize the backup battery pulses with the AC pulses that regularly drive the system.

When the AC power source is restored, the software ensures that the pulses match those driven by the backup batteries. It is important that a clean hand-off occurs between the AC power source and the back-up batteries because it insures that the push-pull driver operates without interruption. In order to ensure that a clean hand-off occurs, the software and battery continue driving the power supply after AC power is restored until the software synchronizes the inverter to the AC power source input. Once the inverter and the AC power source are synchronized, the AC power source resumes driving the system.

Other objects, features, and advantages of the present invention will become apparent upon reading the following detailed description of the embodiments of the invention, when taken in conjunction with the accompanying drawings and appended claims.

BRIEF DESCRIPTION OF THE DRAWINGS

FIG. 5 illustrates waveforms that arc manipulated by the AC power signal generator in an exemplary embodiment of the present invention.

DETAILED DESCRIPTION

Figure 1:
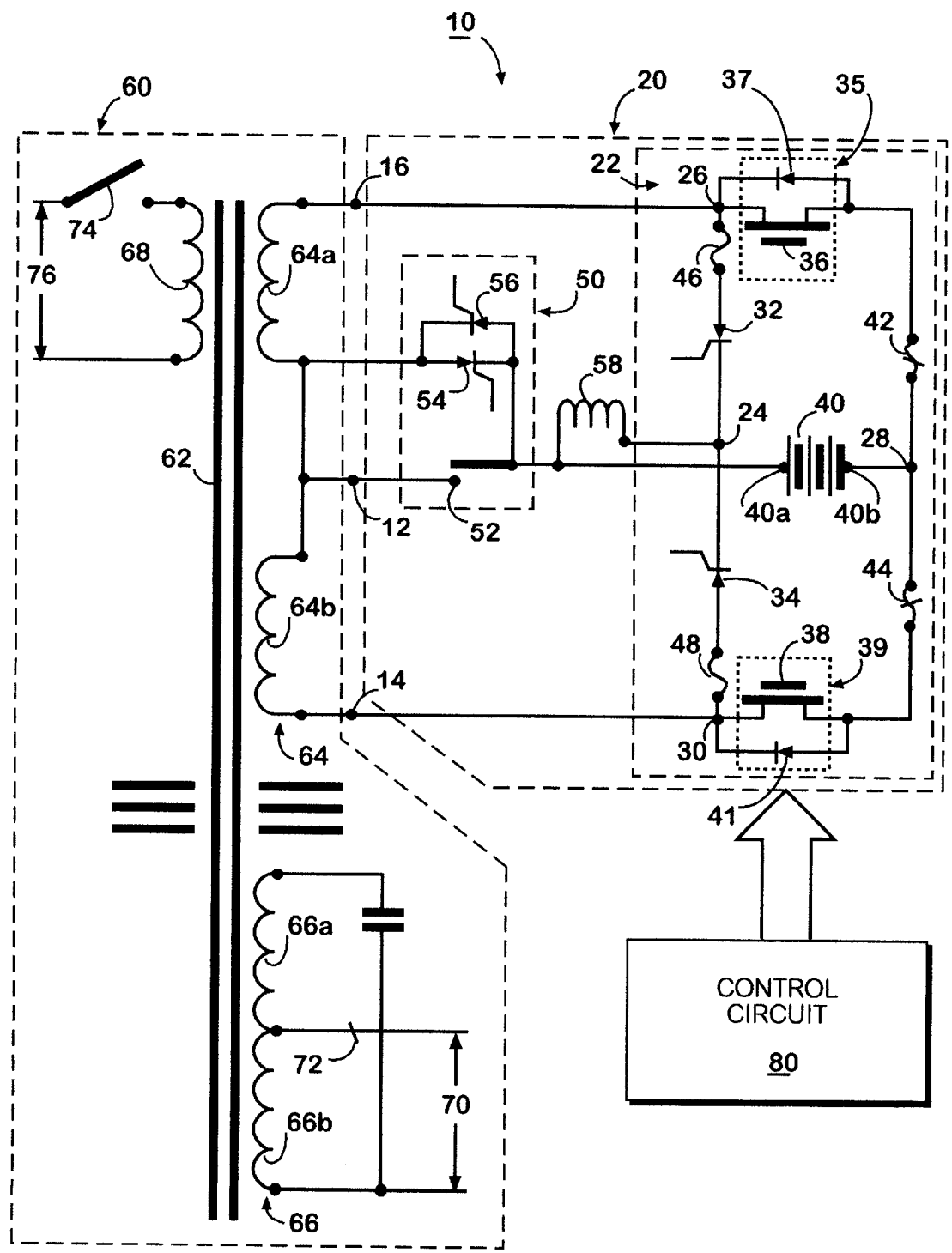
FIG. 1 is a schematic diagram of an exemplary embodiment of a power supply topology in which an exemplary embodiment of the current invention may be implemented.

Referring now to the drawings, in which like numerals refer to like parts throughout the several views, exemplary embodiments of the present invention are described.

Figure 2:
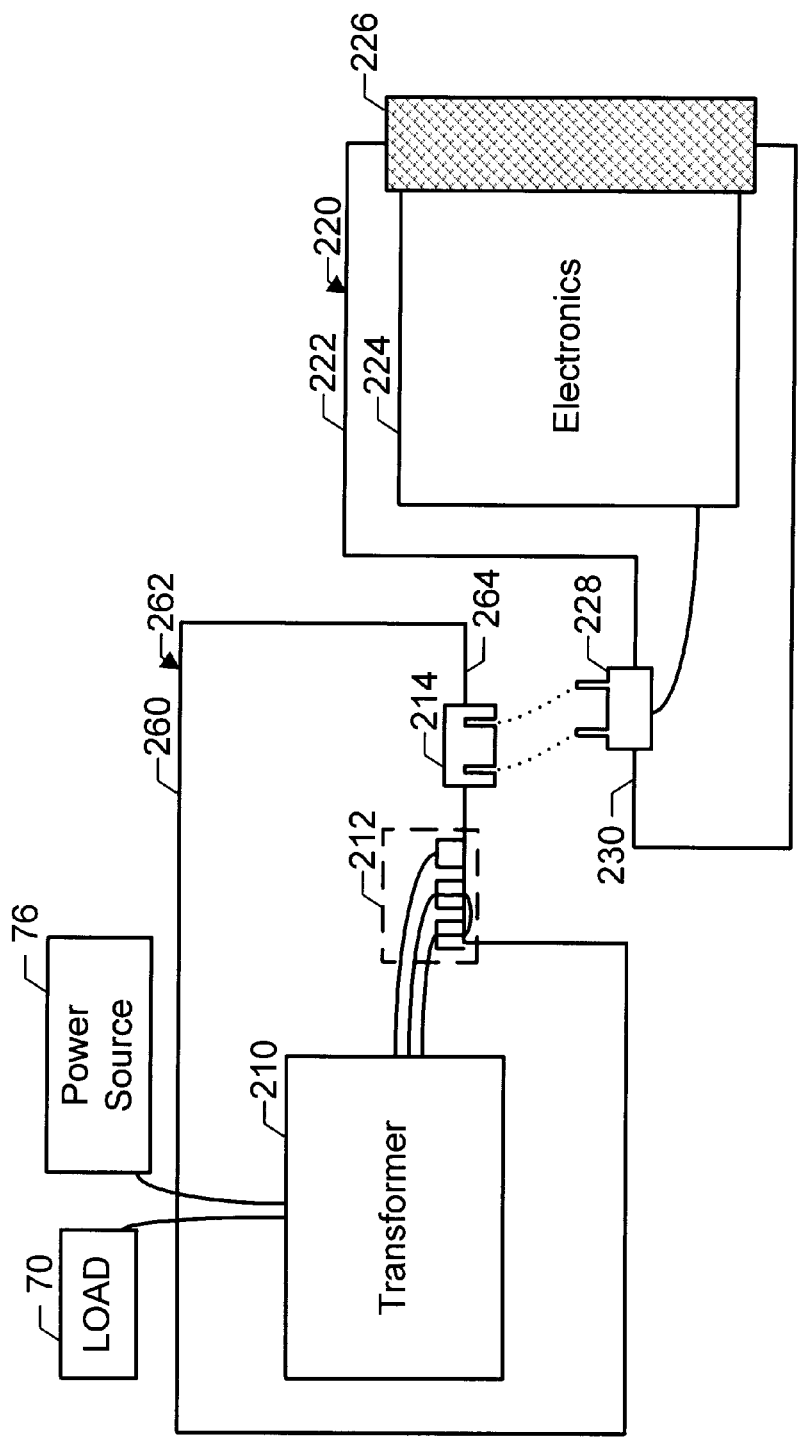
FIG. 2 is a block diagram showing one layout of the major elements of an exemplary embodiment of a power supply in which the present invention may be implemented.
Figure 3:
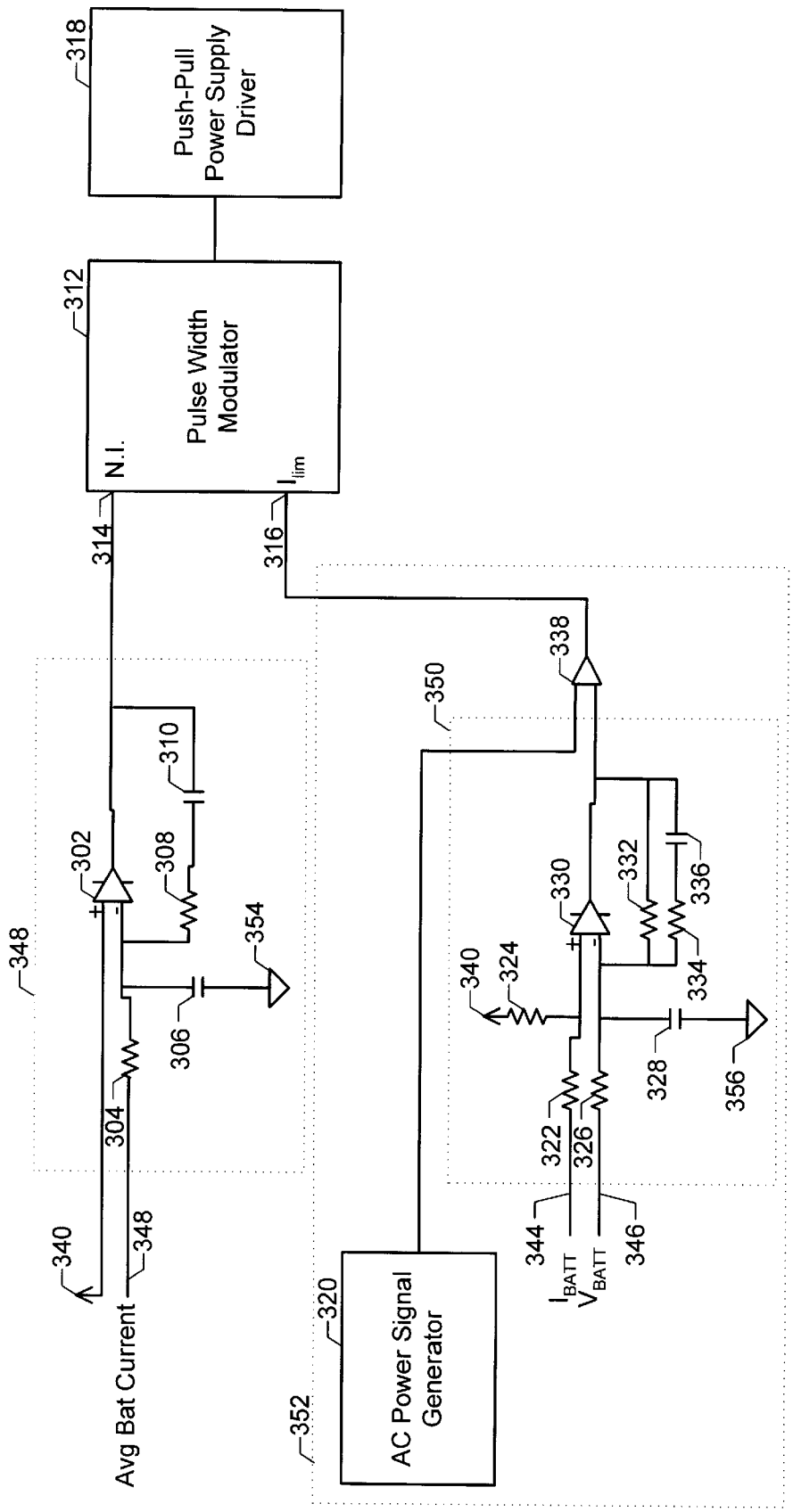
FIG. 3 is a schematic diagram of an exemplary embodiment of a transformer for use in an exemplary embodiment of the present invention.
Figure 4:
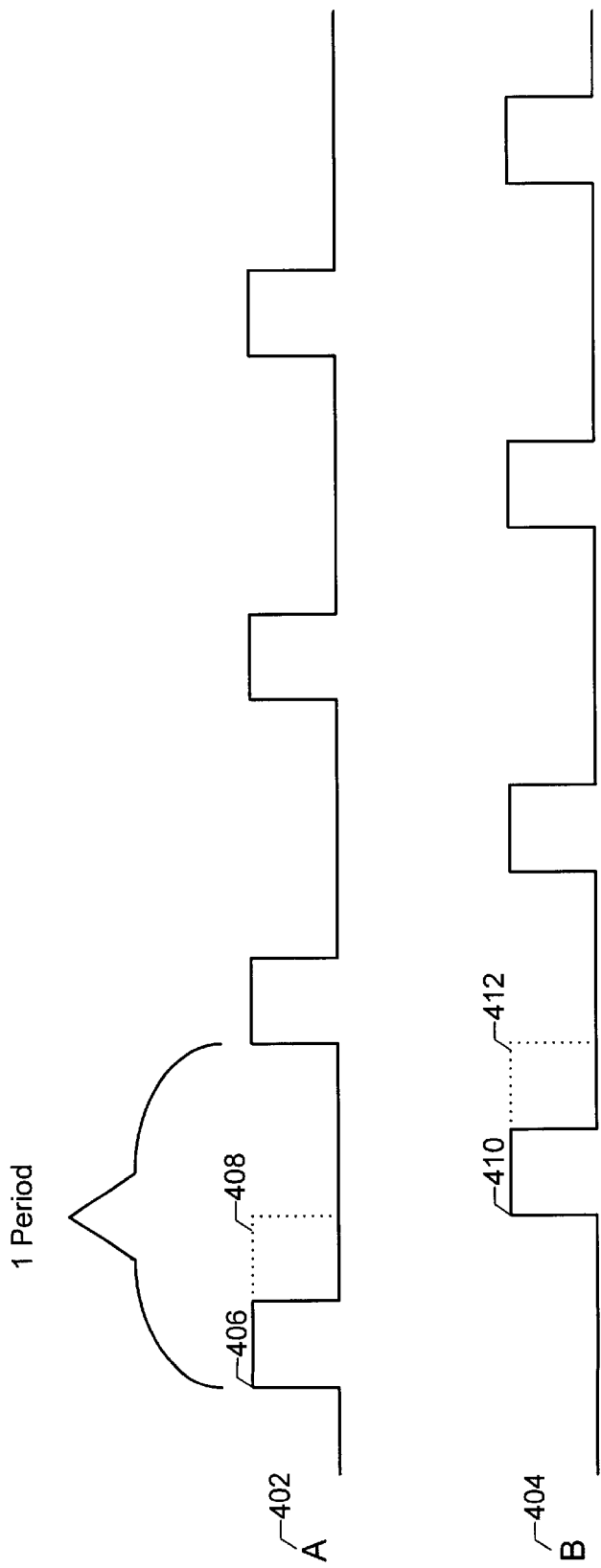
FIG. 4 is a block diagram of the AC power signal generator in an exemplary embodiment of tee present invention.

FIGS. 1 and 2 show an exemplary example of a prior art power supply in which the current invention could be implemented. FIGS. 3, 4, and 5 describe an exemplary embodiment of the present invention. The herein described exemplary embodiment of the present invention yields an uninterruptible power supply that can operate with a variety of battery types or voltages. The uninterruptible power supply monitors the voltage and current loads on the power supply and determines a duty cycle setting that will meet the demands of the system.

FIG. 1 is a schematic diagram of an exemplary embodiment of a power supply topology in which an exemplary embodiment of the current invention may be implemented. The invention operates in conjunction with an uninterruptible power supply 10 that includes an inverter and charging circuit 20 and a control circuit 80 as part of an electronics module and a transformer module 60. The inverter and charging circuit 20 connects to an internal or external rechargeable battery 40 having a positive terminal 40a and a negative terminal 40b. The transformer module 60 houses a transformer that includes a battery side transformer winding 64 (shown as having a first portion 64a and a second portion 64b) having a first terminal 12, a second terminal 16 and a third Terminal 14. A load side transformer winding 66 (shown as having a first portion 66a and a second portion 66b) is inductively coupled to the battery side transformer winding 64 via a core 62. The load side transformer winding 66 may be electrically coupled to a load 70. A power supply side transformer winding 68, capable of receiving normal service power 76, is also inductively coupled to the battery side transformer winding 64 via the core. A relay switch 74 may be supplied to isolate the power supply side transformer winding 68 from service power 76.

The inverter and charging circuit 20 couples the positive terminal 40a of the battery 40 to the first terminal 12 of the battery side transformer winding 64 and couples the negative terminal of the battery 40b to the second terminal 16 and the third terminal 14 of the battery side transformer winding 64. The inverter and charging circuit 20 includes a switching circuit 22 that forms a bridge circuit that allows current from the battery side transformer winding 64 to flow in only one direction into the battery 40 when a switching circuit 50 is in a first switching state. The first switching state may be electrically defined as having silicon controlled rectifiers (SCR) 54 and 56, relay 52 de-energized and open, and relay switch 74 de-energized and closed. Current from the power supply side transformer winding 68 induces an alternating current in the battery side transformer winding 64 that passes through the bridge circuit formed by SCRs 32 and 34, and parasitic diodes 37 and 41 to generate a direct current that charges the battery 40 when the switching circuit 22 is in the first switching state. The switching circuit 22 also forms a push-pull inverter circuit that generates an alternating current from a direct current supplied by the battery 40 when the switching circuit 22 is in a second switching state, thereby inducing an alternating current in the load side transformer winding 66. The second switching state may be defined as having SCRs 54 and 56, relay 52 energized and closed, and relay switch 74 energized and open.

A control circuit 80 drives the switching circuits 22 and 50 into the first switching state when at least a predetermined power level is supplied to the power side transformer winding 68 (i.e., when normal power is being supplied to the power side transformer winding 68). The control circuit 80 drives the switching circuits 22 and 50 into the second switching state when less than the predetermined power level is supplied to the power side transformer winding 68 (i.e., when normal power to the power side transformer winding 68 is interrupted, such as due to a power outage).

The inverter and charging circuit 20 has a first node 24 electrically coupled to the positive terminal 40a of the battery 40, a second node 26 electrically coupled to the second tennis 16 of the battery side winding 64, a third node 28 electrically coupled to the negative terminal 40b of the battery 40 and a fourth node 30 electrically coupled to the third terminal 14 of the battery side winding 64.

The inverter and charging circuit 20 includes a first transistor 35 coupling the second node 26 to the third node 28 and biased so as to be capable of conducting current in either direction between the third node 28 and the second node 26 when the first transistor 35 is in a first transistor state. The first transistor 35 is capable of conducting current flowing only from the second node 26 to the third node 28 when the first transistor 35 is in a second transistor state (to demonstrate this relationship, FIG. 1 shows the first transistor 35 as a field effect transistor (FET) 36 in parallel with a diode 37). The inverter and charging circuit 20 may also include current sensors 42 and 44 to sense current flow to the battery 40.

A second transistor 39, shown in FIG. 1 as a FET 38 in parallel with a diode 41, couples the fourth node 30 to the third node 28 and is biased so as to be capable of conducting current flowing in either direction between the third node 28 and the fourth node 30 when the second transistor 39 is in a first transistor state and capable of conducting current flowing only from the fourth node 30 to the third node 28 when the second transistor 39 is in a second transistor state. The first transistor state and the second transistor state is determined by a signal level supplied to the gating junction of the first transistor and the second transistor by the control circuit 80. Fuses 46 and 48 may also be provided for circuit protection.

The first SCR 32 electrically couples the second node 26 to the first node 24 and is biased so as to be capable of conducting current flowing only from the second node 26 to the first node 24 when the first SCR 32 is in a conductive state. The first SCR 32 also acts as an open circuit when the first SCR 32 is in a non-conductive state. A second SCR 34 electrically couples the fourth node 30 to the first node 24 and is biased so as to be capable of conducting current flowing only from the fourth node 30 to the first node 24 when the second SCR is in a conductive state. The second SCR 34 also acts as an open circuit when the second SCR is in a non-conductive state. Whether the first SCR 32 and the second SCR 34 are in the conductive state depends on a signal value from the control circuit 80 applied to the control input of the SCR.

The control circuit 80 (the function of which includes that of an inverter control circuit) is electrically coupled to the gates of the first transistor 35 and to the second transistor 39. The control circuit 80 alternates between generating a first inverter control signal value and a second inverter control signal value when the switching circuit 22 is in a second switching state. The first inverter control signal value drives the first transistor 35 into the first transistor state and the second transistor 39 into the second transistor state. The second inverter control signal value drives the first transistor 35 into the second transistor state and the second transistor 39 into the first transistor state. Thus, by alternately generating the first inverter control signal value and the second inverter control signal value, the control circuit 80 causes the inverter and charging circuit 20 to generate an alternating current from the direct current of the battery 40.

A power supply switch 50 electrically decouples the positive terminal 40a of the battery from the first terminal 12 of the battery side transformer winding 64 when the switching circuit 22 is in the first switching state and electrically couples the positive terminal 40a of the battery to the first terminal 12 of the battery side transformer winding 64 when the switching circuit is in the second switching state. The power supply switch 50 includes a relay 52 that electrically couples the positive terminal 40a of the battery 40 to the first terminal 12 of the battery side transformer winding 64 when the relay 52 is closed and that electrically decouples the positive terminal 40a of the battery 40 from the first terminal 12 of the battery side transformer winding 64 when the relay 52 is open. Also, to provide immediate back-up power (during the time it takes the relay 52 to close), the power supply switch 50 includes a third SCR 56 that allows current to flow in a first direction and fourth SCR 54 that allows current to flow in a second direction opposite the first direction. The third SCR 56 and the fourth SCR 54 are electrically coupled in parallel so That current may flow in either the first direction or the second direction when both the third SCR 56 and the fourth SCR 54 are in a conductive state. The third SCR 56 and the fourth SCR 54 electrically couple the positive terminal 40a of the battery 40 to the first terminal 12 of the battery side transformer winding 64 when they are in a transmissive state. The third SCR 56 and the fourth SCR 54 are driven to the transmissive state and the relay 52 is closed by the control circuit 80 upon to onset of a interruption of service power 76 to the power supply side transformer winding 68. An inductor 58, electrically coupling charging SCRs 32 and 34 to the battery positive terminal 40a, provides charge current ripple filtering when the circuit is in the first switching state.

The inverter and charging circuit 20 and the switch circuit 50 of this embodiment of the invention allows the battery side winding 64 to be used both in recharging the battery 40 when normal power is available and in supplying back up power from the battery 40 when normal power is interrupted. This is done without requiring an extra winding. Switch circuit 50, being normally open, additionally prevents damaging currents from flowing if battery 40 is connected backwards or if the battery connecting leads are shorted during product application.

FIG. 2 is a block diagram showing one layout of the major elements of an exemplary embodiment of a power supply in which the present invention may be implemented. As shown in FIG. 2, the uninterruptible power supply includes a transformer module 260, disposed in a first enclosure 262. The transformer module 260 includes a transformer 210 that is couplable to both a charging power source 76 and a load 70. The first enclosure 262 includes a first interior wall 264 and a first electrical connector 214 (which could be, e.g., either a male electrical plug or a female electrical receptacle) affixed thereto. The first electrical connector 214 is electrically coupled to a battery side winding 64 (as shown in FIG. 1) of the transformer 210. The transformer module also includes an opening for venting heat from the transformer module.

An electronics module 220 is disposed in a second enclosure 222. The second enclosure 222 includes a second interior wall 230 that is complementary in shape to the first interior wall 264. The electronics module includes continuous power supply electronics 224, such as the control circuits, an inverter and a recharging circuit (examples of these items were discussed above with reference to the embodiment shown in FIG. 1).

A second electrical connector 228 (which could be, e.g., either a male electrical plug or a female electrical receptacle, so long as it is of opposite gender from the first electrical connector 214) is affixed to the second interior wall 230 and is complementary to the first electrical connector 214. The second electrical connector 228 is electrically coupled to both the inverter and the recharging circuit. Both the inverter and the recharging circuit may be electrically coupled to the battery side winding of the transformer 210 by physically coupling the first electrical connector 214 to the second electrical connector 228.

The electronics module 220 may also include a heat sink 226 disposed along an exterior surface of the electronics module 220 and spaced apart from the second interior wall 230 so as to transmit from the electronics module 220 at least a portion of any heat generated within the electronics module 220. Placing the heat sink 226 away from he transformer 210 simplifies cooling of the power supply.

One or more voltage control jumpers 212 may be disposed on the first interior wall 212 to allow for changes in voltage standard of the power source 76. By placing the jumpers 212 on the first interior wall 212, they will be accessible when the first electrical connector 214 is not physically coupled to the second electrical connector 228, but will be inaccessible when the first electrical connector 214 is physically coupled to the second electrical connector 228, thereby preventing unauthorized access to the jumpers 212.

The modularity of this embodiment of the invention allows die uninterruptible power supply to be shipped, sold, upgraded, or installed as separate unit. Also, by separating the transformer module 260 from the electronics module 220, heat removal becomes less costly and makes the power supply less susceptible to heat-related failure.

FIG. 3 is a schematic diagram of an exemplary embodiment of a transformer for use in an exemplary embodiment of the present invention, As shown in FIG. 3, an average current loop circuit 348 and a pulse width generator 352 are coupled to a pulse width modulator 312. The pulse width modulator 312 is coupled to a push-pull driver of an inverter circuit 318.

In an exemplary embodiment of the present invention, the duty cycle of the transformer automatically adjusts based upon changes in the battery voltage and average battery current. This is accomplished by monitoring the voltage and current loads on the power supply and determining a duty cycle setting that will meet the demands of the system. The average current loop circuit 348 limits the inverter duty cycle if the average battery current exceeds a desired level. The pulse width generator 352 generates pulse flags that terminate pulse width modulation output pulses that control the length of the duty cycle. The pulse width modulator 312 is coupled to the average current loop circuit 348 and the pulse width generator 352 for generating pulses for driving a power supply.

In an exemplary embodiment of an average current loop circuit, the non-inverting input of an operational amplifier 302 (op-amp) is coupled to a reference voltage 340. The inverting input of the op-amp 302 is coupled to an average battery current 345 input through a resistor 304 in series with the inverting input of the op-amp 302. Additionally, the inverting input of the op-amp 302 is coupled to an alternative source 354 (such as ground) through a capacitor 306. The output of the op-amp 302 is coupled to the inverting input of the op-amp 302 through a feedback loop comprised of the series combination of a resistor 308 and a capacitor 310. This circuit limits the inverter duty cycle if the average battery current exceeds the desired level set by the reference voltage 340.

In an exemplary embodiment of the present invention, a pulse width generator 352 is comprised of an AC power signal generator 320 and an adjustable reference voltage generator 350 coupled to a comparator 338. In an exemplary embodiment of an adjustable reference voltage generator 350, the non-inverting input to an op-amp 330 is coupled to a battery current input ($I_{BATT}$) 344 through a resistor 322 in series with the non-inverting input of the op-amp 330. Additionally, the non-inverting input of the op-amp 330 is connected to a reference voltage 340 through a resistor 324 in series with the non-inverting input of the op-amp 330. The inverting input of the op-amp 330 is connected to a battery voltage input ($V_{BATT}$) 346 through a resistor 326 in series with the inverting input of the op-amp 330. Additionally, the inverting input of the op-amp 330 is connected to an alternate source 356 (such as a ground) through a capacitor 328. The output of the op-amp 330 is coupled to the inverting input of the op-amp 330 through a feedback loop. The feedback loop is comprised of the parallel combination of a resistor 332 with the series combination of a resistor 334 and a capacitor 336. This circuit produces end of pulse flags that terminates pulse width modulation output pulses to control the duty cycle. The pulse width determines the length of the duty cycle of the wave that drives the power supply. If the pulse flags were not generated, the pulses would extend to a full pulse width and produce a 100% duty cycle. This is described further in relation to FIG. 4.

The output of the comparator 338 in the pulse width generator 352 is coupled to the current limit ($I_{LIM}$) 316 input of the pulse width modulator 312. The output of the average current loop circuit 348 is coupled to the non-inverting (N.I.) input 314 of the pulse width modulator 312. The output of the pulse width modulator 312 is coupled to the input of the push-pull driver of the power supply 318. Those skilled in the art are knowledgeable in the operation of pulse width modulators and push-pall drivers of power supplies.

FIG. 4 is a diagram of the push-pull wave form in an exemplary embodiment of the present invention. As shown in FIG. 4, the push-pull wave form is comprised of two pulse signals, A 402 and B 404. In an exemplary embodiment of the present invention, each pulse signal, A 402 and B 404, is a square wave. Pulse signals A 402 and B 404 are 180 degrees our of phase from one another. The length of each pulse 406 and 410 is determined by the duty cycle used for the pulse generation. If a 100% duty cycle were used, the pulse signals A 402 and B 404 would abut one another. This is shown by extending pulse 406 to include pulse 408 shown with a dotted line, Also, pulse 410 would be extended to include pulse 412 shown with a dotted line. Typically, a duty cycle between 30% and 50% is used FIG. 4 illustrates a 50% duty cycle.

In an exemplary embodiment of the present invention, the duty cycle adjusts automatically based upon changes in the battery voltage and average battery current. This is done by monitoring the voltage and current loads on the power supply and determining a duty cycle setting that will meet the demands of the system.

The length of the desired duty cycle is determined based upon the characteristics of the battery voltage and load current. If a high battery voltage is used, a narrower pulse is needed and thus a lower duty cycle is produced. If a higher load current is desired, a wider pulse is needed and thus a higher duty cycle is produced. In a particular embodiment of the present invention, the duty cycle is adjusted automatically.

FIG. 5 illustrates waveforms that are manipulated by the AC power signal generator in an exemplary embodiment of the present invention. A sinusoidal AC power source 502 drives the input of the AC power signal generator 320. Those skilled in the art are knowledgeable in methods of translating a sinusoidal waveform into a sawtooth waveform. In an exemplary embodiment of the present invention, the sinusoidal waveform is first translated into square wave pulses 504 that correspond to each zero crossing of the sinusoidal waveform. The square wave pulses 504 are then translated into a sawtooth waveform 506. The sawtooth waveform 506 is output from the AC power signal generator 320 and input to a comparator 338.

Software inside the power supply monitors the pulses generated by the AC power source. When the AC power source is interrupted, the software generates pulses that match those produced by the AC power source. The software uses these pulses to synchronize the backup battery pulses with the AC pulses that regularly drive the system.

When the AC power source is recovered, the software ensures that the pulses match those driven by the backup batteries. It is important that a clean band-off occurs between the AC power source and the back-up batteries because it ensures that the push-pull driver operates without interruption. In order to ensure that a clean hand-off occurs, the software and battery continue driving the power supply after AC power is restored until the software synchronizes the battery to the AC power source input. Once the battery power source and the AC power source are synchronized, the AC power source resumes driving the system.

Alternate embodiments will become apparent to those skilled in the art to which the present invention pertains without departing from its spirit and scope. Accordingly, the scope of the present invention is described by the appended claims and supported by the forgoing description.

What is claimed is:

1. A method of operating an uninterruptible power supply having a primary power source, a secondary battery power source, and an inverter having an inverter duty cycle, the method comprising:

monitoring a power supply voltage load on the uninterruptible power supply;

monitoring a power supply current load on the uninterruptible power supply;

determining a primary power supply excitation waveform based on the power supply voltage load and the power supply current load;

inputting a secondary battery power source input having a secondary battery power source voltage;

determining an inverter duty cycle setting that will produce a battery excitation waveform that is substantially equivalent to said primary power supply excitation waveform when the power supply is energized by the secondary battery power source having the secondary battery power source voltage; and adjusting the inverter duty cycle of the uninterruptible power supply to the determined inverter duty cycle setting; thereby enabling the uninterruptible power supply to operate using the secondary battery power source having the secondary battery power source voltage to produce a battery power supply excitation waveform substantially similar to said primary power supply excitation waveform.

2. An uninterruptible power supply device comprising:

an inverter;

an average battery current input for inputting an average battery current;

a primary power source input for inputting a primary power source having a primary power source waveform;

a secondary battery power source having a secondary battery power source voltage;

a pulse width generator for generating a first pulse waveform having a first pulse duty cycle;

an average current loop circuit for modifying the length of the first pulse duty cycle to form a second pulse duty cycle based at least in part on the average battery current;

a pulse width modulator coupled to the average current loop circuit and the pulse width generator for generating a second pulse waveform having said second pulse duty cycle; and said inverter utilizing said second pulse waveform in conjunction with said secondary battery power source to produce an output waveform substantially equivalent to the primary power source waveform; thereby enabling the uninterruptible power supply device to operate using a plurality of secondary power sources having different secondary battery power source voltages.

3. The power supply device of claim 1, wherein the transformer is a ferro-resonant transformer.

4. The power supply device of claim 3, wherein the voltage sources include 36 volt and 48 volt batteries.

5. The power supply device of claim 3, wherein the pulse width modulator generates two square wave pulse waves.

6. The power supply device of claim 5, wherein the two square wave pulse waves are 180 degrees out of phase from one another.

7. The power supply device of claim 6, wherein the square wave pulse waves have a variable duty cycle.

8. A method of operating an uninterruptible power supply having a primary and a secondary power source, and an inverter circuit; the method comprising:

monitoring a current load on the primary power souce of the uninterruptible power supply to determine a desired output waveform;

generating a duty cycle correlated to said desired output waveform;

inputting a secondary power source having a secondary power source voltage; and utilizing said duty cycle in connection with said secondary power source to produce said desired output waveform independent from the secondary power source voltage;

thereby enabling the uninterruptible power supply to operate using a plurality of secondary power sources having different secondary power source voltages.

9. The method of claim 8, wherein said secondary power source is a battery.

* * * * *